US005200743A

United States Patent [19]
St. Martin et al.

[11] Patent Number: 5,200,743
[45] Date of Patent: Apr. 6, 1993

[54] MULTIPLE REMOTE SENSOR SYSTEM FOR REAL TIME ANALOG SENSING AND DIFFERENTIAL CUMMUNICATION

[75] Inventors: Michael J. St. Martin, South lake Tahoe, Calif.; Roger A. Hala, Gardnerville, Nev.

[73] Assignee: Bently Nevada, Minden, Nev.

[21] Appl. No.: 721,697

[22] Filed: Jun. 26, 1991

Related U.S. Application Data

[63] Continuation of Ser. No. 403,123, Sep. 1, 1989, abandoned.

[51] Int. Cl.$^5$ .................. H04Q 9/14; G08C 15/06
[52] U.S. Cl. .................. 340/825.07; 340/310 R; 340/825.54
[58] Field of Search ........... 340/310 R, 310 A, 505, 340/517, 825.06, 825.07, 825.08, 825.16, 825.54, 825.57, 825.09, 825.18, 518, 538, 825.53; 307/113; 370/85.2; 73/232; 364/509

[56] References Cited

U.S. PATENT DOCUMENTS

| | | |
|---|---|---|
| 3,755,781 | 8/1973 | Haas et al. |
| 3,872,437 | 3/1975 | Cross ................. 340/825.07 |
| 4,032,916 | 6/1977 | Galvin et al. ............ 340/409 |
| 4,091,361 | 5/1978 | Eichelberger et al. ....... 340/825.53 |
| 4,200,862 | 4/1980 | Campbell et al. ........... 340/310 A |
| 4,203,096 | 5/1980 | Farley et al. ............. 340/538 |
| 4,222,035 | 9/1980 | Lohoff |
| 4,290,055 | 9/1981 | Furney et al. ............ 340/505 |
| 4,328,482 | 5/1982 | Belcher et al. ........... 340/310 A |
| 4,331,952 | 5/1982 | Galvin et al. ............ 340/508 |
| 4,369,436 | 1/1983 | Lautzenheiser ........... 340/506 |
| 4,441,107 | 4/1984 | Chaborski et al. ......... 340/870.16 |
| 4,487,065 | 11/1984 | Carlin et al. ............ 364/509 |
| 4,529,971 | 7/1985 | James ................... 340/508 |
| 4,540,890 | 9/1985 | Gangemi et al. .......... 340/310 R |
| 4,555,695 | 11/1985 | Mashida et al. ........... 340/538 |
| 4,555,930 | 12/1985 | Leach et al. ............ 73/23.2 |
| 4,558,316 | 12/1985 | Yong ................... 340/825.06 |
| 4,573,041 | 2/1986 | Kitagawa et al. .......... 340/538 |
| 4,575,711 | 3/1986 | Suzuki et al. ........... 340/521 |
| 4,595,921 | 6/1986 | Waps et al. ............ 340/825.08 |
| 4,613,848 | 9/1986 | Watkins ................ 340/505 |
| 4,628,308 | 12/1986 | Robert ................. 340/825.43 |
| 4,633,218 | 12/1986 | Palsgrove et al. ......... 340/310 |
| 4,654,654 | 3/1987 | Butler et al. ........... 340/825.5 |

(List continued on next page.)

FOREIGN PATENT DOCUMENTS

| | | | |
|---|---|---|---|
| 56-40345 | 4/1981 | Japan ............... 340/825.08 |
| 59-160350 | 9/1984 | Japan ............... 340/825.08 |

(List continued on next page.)

OTHER PUBLICATIONS

Octapak Sales Brochure, by Action Instruments of San Diego, Calif., May, 1984.
Transpak Sales brochure "Two Wire Transmitters" by Action Instruments of San Diego Calif. Mar. 1989.

(List continued on next page.)

Primary Examiner—Donald J. Yusko
Assistant Examiner—John E. Giust
Attorney, Agent, or Firm—Limbach & Limbach

[57] ABSTRACT

A four-wire system is disclosed for communicating between the host station and several remote stations. A first pair of wires is employed across which the remote stations are coupled in shunt, and over which the host station addresses the particular remote station with which it wishes to communicate, and supplies power to the several remote stations. The remote stations are coupled in shunt to a second pair of wires and transmit real time analog information to the host station over the second pair of wires. Each remote station includes a receiving section, which determines whether an address appearing on the first pair of wires corresponds to the particular remote station, and if so, activates power to a transmitting section therein. The transmitting section responds to control information extracted by the receiving section from the address and transmits selected real time information back to the host station over the second pair of wires by way of a differential voltage format. The control information includes instructions as to the source of real time information to be transmitted by the transmitting section to the host station.

18 Claims, 11 Drawing Sheets

U.S. PATENT DOCUMENTS

| | | | |
|---|---|---|---|
| 4,667,193 | 5/1987 | Cotie et al. | 340/825.08 |
| 4,683,531 | 7/1987 | Kelch et al. | 364/200 |
| 4,727,539 | 2/1988 | Yushi et al. | 340/518 |
| 4,733,224 | 3/1988 | Kimura | 340/521 |
| 4,807,223 | 2/1989 | Wells | 370/85.2 |
| 4,831,558 | 5/1989 | Shoup et al. | 340/825.06 |
| 4,853,685 | 8/1989 | Vogt | 340/825.170 |

FOREIGN PATENT DOCUMENTS

| | | | |
|---|---|---|---|
| 59-172857 | 9/1984 | Japan | 340/825.08 |
| 21765640 | 12/1986 | United Kingdom | 340/517 |

OTHER PUBLICATIONS

Digital Transmittors Series R2000 Product Brochures by Roschester Ins. Systems, Roschester N.Y. 1988 ©.

The Sensor Highway Sales Brochure, by Westinghouse Energy Systems, Nuclear Technology Division, Pittsburg Pa.

Series 9000 Sales Brochure, Palomar Technology International, Carlsbad Calif. May 1988.

Distributed Data Acquisition with the Isolated Measurement Pod, Sales Brocuhure, Solartron Instruments, Hampshire England Apr. 1987.

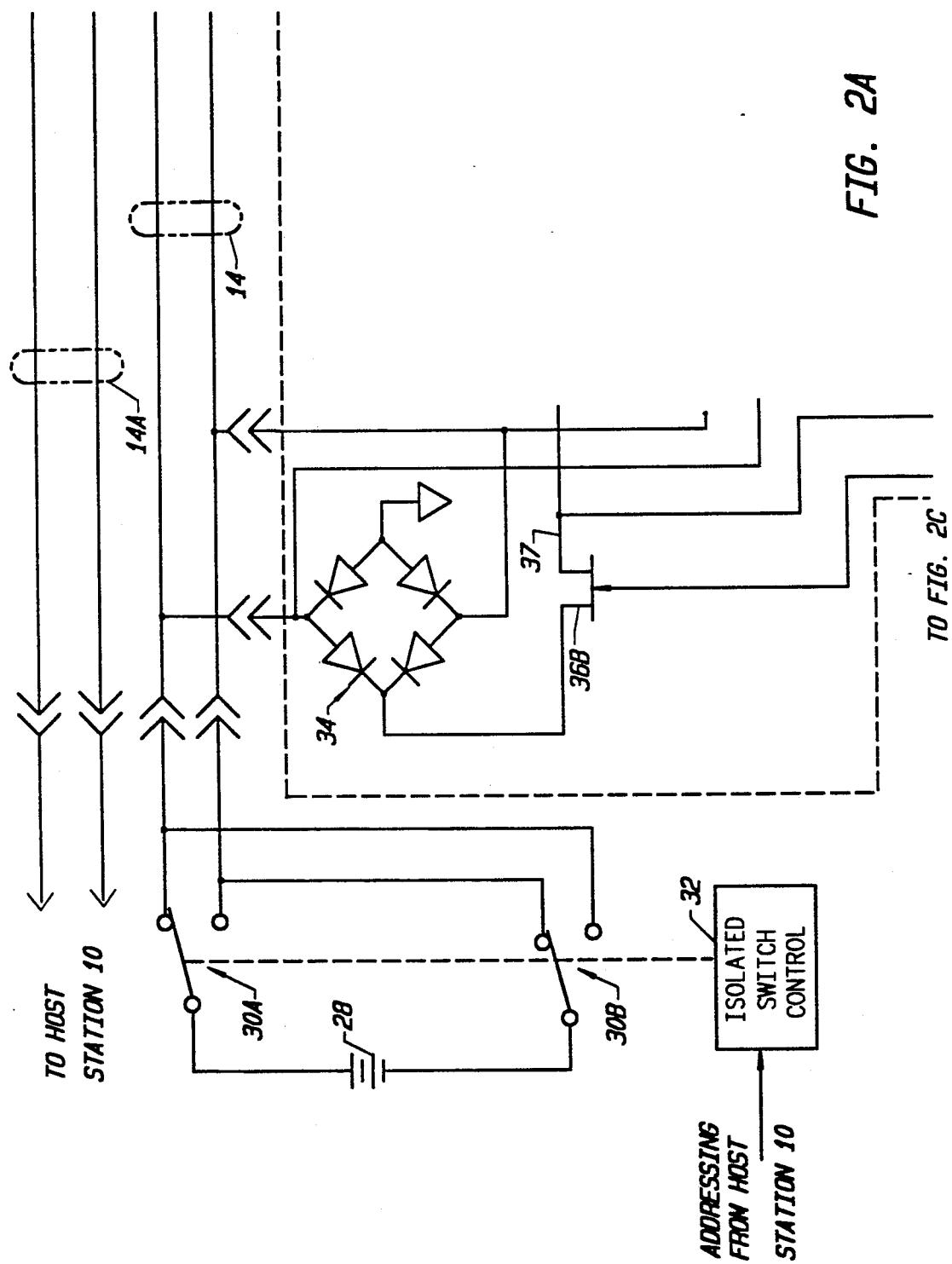

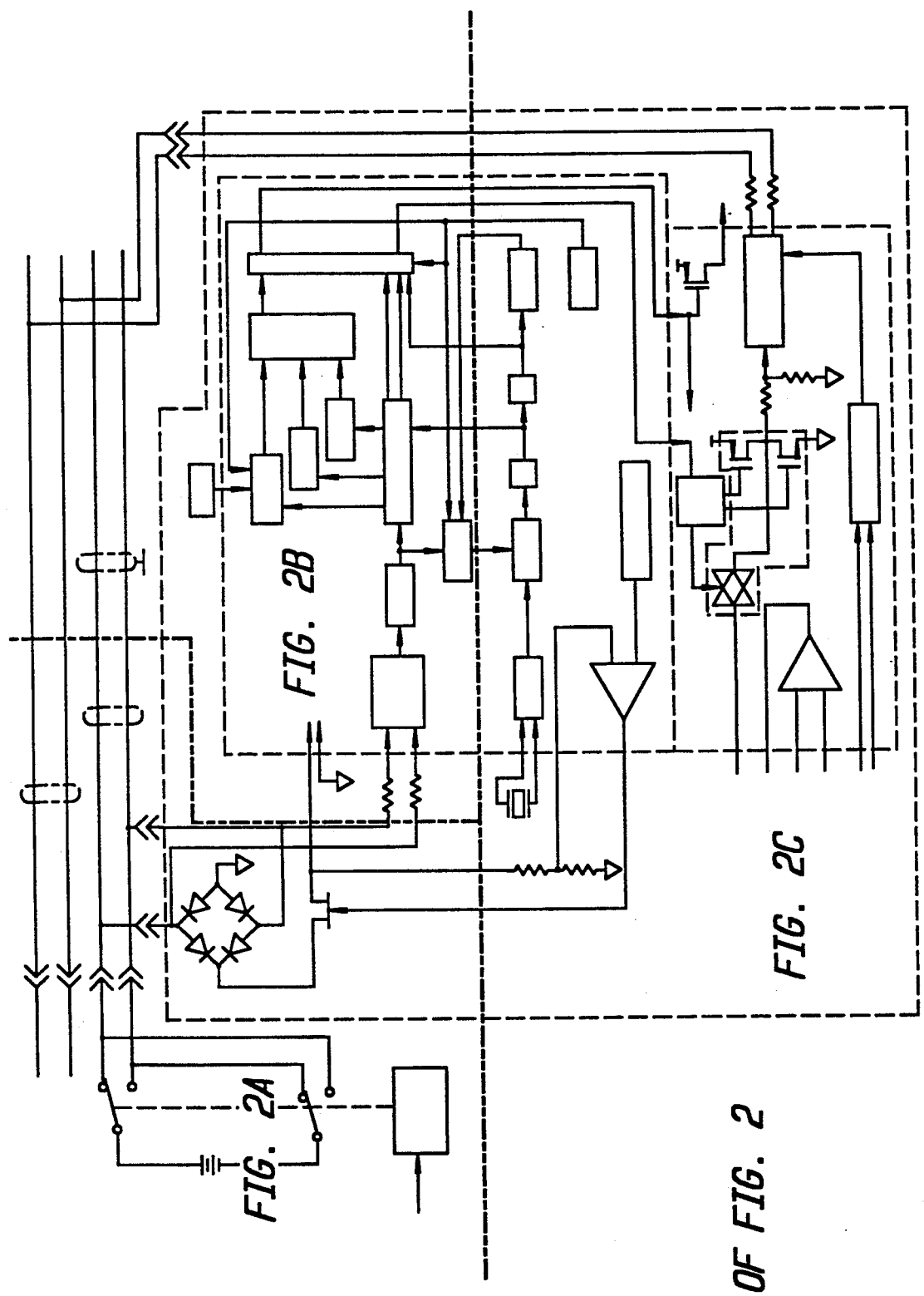

MULTIPLE REMOTE SENSOR SYSTEM FOR REAL TIME ANALOG SENSING AND DIFFERENTIAL CUMMUNICATION

This is a continuation of application Ser. No. 07/403,123, filed Sep. 1, 1989, now abandoned.

TECHNICAL FIELD

The present invention is generally directed to a communications system, and more particularly to a system in which a host station communicates with a plurality of remote sensor stations over two pairs of lines.

BACKGROUND ART

Communication between a host station and several remote stations over a limited number of lines is an area which has been a subject of numerous patents and proposed architectures. The key areas addressed by these approaches include the number and function of lines which interconnect the host station with the remote stations, the powering of the remote stations, the addressing of the remote stations by the host station, the requesting of remote station transmissions back to the host station, and the interfacing requirements between the remote stations and the interconnecting lines.

The cost of such systems depends upon the particular architecture chosen. The particular architecture chosen also governs whether a system is usable in a particular environment. In environments where access is limited, where power is not available, where the conditions are hazardous or where there are specific requirements on wiring entering or leaving the area, the state of the art architecture does not provide a satisfactory solution.

Typical of a generalized communications bus are the RS232 and RS485 bus standards. These architectures employ separate power, address and digital data lines. The series 9000 product, manufactured by Palomar Technology International of Carlsbad, Calif., employs a local area net among local monitoring units, based upon the RS485 standard. The Sensorbus Product, manufactured by Transensory of Fremont, Calif.; the Digital Transmitters Series R2000 product, manufactured by Rochester Instrument Systems of Rochester, N.Y.; and the Octapak product, manufactured by Action Instruments of San Diego, Calif.; employ an RS232 standard interconnection scheme among remote units.

Two line systems exchange power, addresses and data over a common pair of lines. As such, there are a variety of techniques used to permit the simultaneous use of the lines for such different purposes. U.S. Pat. Nos. 4,555,695 and 4,727,359, to Machida et al. and Yuchi et al., respectively, disclose two wire systems pertinent to the present invention. However, among other things, the two wire systems disclosed utilize data transmission and addressing schemes which significantly limit the manner in which data can be obtained from the remote stations and the information content of any data transmitted. Other two-wire systems include those disclosed in U.S. Pat. No. 4,200,862 to Campbell et al., which is directed to a carrier current approach; in U.S. Pat. No. 4,441,107, to Chaborski, which provides addresses on a different line from analog data, and in which power is supplied independently at the site of the remote stations; and in U.S. Pat. No. 4,573,041 to Kitagawa, U.S. Pat. No. 4,203,096 to Farley, and U.S. Pat. No. 4,613,848, to Watkins, which apply power, address and digital data on the same pair of lines. In a product called the Sensor Highway, manufactured by Westinghouse Energy Systems, Nuclear Technology Systems Division, Pittsburgh, Pa., AC power and analog data are provided on the same pair of wires. In a product called the S-Net, manufactured by Solatron, Schlumberger, of Hampshire, England, a 2-wire cable is used to carry power and bi-directional data between remote isolated measurement pods. In a product called the Transpak, manufactured by Action Instruments of San Diego, Calif., two wires are used to provide power to a remote sensor and a signal path for signals from the remote sensor.

Four wire systems employ two pairs of wires with each pair carrying different combinations of power, addressing and signal information. U.S. Pat. No. 4,331,952, to Galvin et al. discloses a four wire system having one wire each for "signal", "power", and "carrier" functions, which interconnects adapters which handle redundant sensors. U.S. Pat. No. 4,290,055 to Furney et al. employs a four wire system in which data pulses from remote detector stations are returned on one wire, power is supplied on a separate wire, and an interrogation pulse is passed from detector station to detector station on a third wire which interconnects the detector stations in series.

U.S. Pat. No. 4,032,916 to Galvin et al., discloses a five-wire system which does not appear to employ the addressing of individual transceiver units.

Other references which represent the state of the art include Japanese Patent No. 59-160350 to Yasuda; Japanese Patent No. 59-172857 to Tadachi; Japanese Patent No. 56-40345 to Oka; U.S. Pat. No. 4,683,531 to Kelch; U.S. Pat. No. 4,667,193 to Cotie; U.S. Pat. No. 4,654,654 to Butler; U.S. Pat. No. 4,595,921 to Wang; U.S. Pat. No. 3,755,781 to Haas; U.S. Pat. No. 4,369,436, to Lautzenheiser; U.S. Pat. No. 4,529,971, to James; U.S. Pat. No. 4,575,711, to Suzuki et al.; and U.S. Pat. No. 4,628,308, to Robert.

SUMMARY OF THE INVENTION

The foregoing problems and disadvantages of previous communication architectures are overcome by the present invention of a four-wire system for communicating between the host station and a plurality of remote stations comprising two pairs of wires across which the plurality of remote stations are coupled in shunt, one pair of which is used by the host station to address the particular remote station with which it wishes to communicate and to supply power to the plurality of remote stations, and the remaining pair of which is used by the host station to receive real time analog information from the remote stations.

The remote stations include receiving means and transmitting means, wherein the receiving means determine whether an address appearing on the pair of lines corresponds to the particular remote station, and if so, activate power to the transmitting means and any signal conditioning circuitry that may be used. The transmitting means responds to control information from the receiving means and transmits selected real time information back to the host station over the remaining pair of lines by way of a differential voltage format.

The receiving means extracts the control information from the addressing information received from the host station. The control information includes instructions as to the source of the real time information to be transmitted by the transmitting means to the host station.

As indicated above, one pair of the four wires provides power and addressing. In the preferred embodiment of the present invention, a power supply is connected to one pair of wires to supply power to the remote units. Further, means are provided for reversing the connections of the power supply to this pair of wires to allow a differential address signal to be produced in response to address-bit sequences from the host station. In this manner, power and address information from the host can coexist on the same pair of lines. The remaining pair of wires is used by the remote stations to return an analog differential voltage signal.

In the preferred embodiments of the present invention, the host station utilizes a differential operational amplifier configuration to reject common mode noise signals and accept the differential voltage signals from the remote stations.

Remote stations can detect addresses while transmitting and the host can transmit addresses while the remote stations are transmitting, however, in the preferred embodiment of the present invention, the host does not process analog data from the remote stations while addresses are being sent.

With a four line system in accordance with the present invention, the per station cost is greatly reduced and additional remote stations can be added with minimal site preparation.

It is therefore an object of the present invention to provide a communications system which utilizes a minimum of interconnecting wires.

It is another object of the present invention to provide a communications system in which addressing to, power to, and data from remote stations are provided over two pairs of wires.

It is a further object of the present invention to provide a communications system having a plurality of remote stations in which a receiving section is active at all times, and a transmitting section is activated only when the host station desires information to be communicated back from the particular remote station.

It is a still further object of the present invention to provide a communications system between a host station and a plurality of remote stations in which real time analog information is transmitted from the remote stations to the host station by way of a differential voltage format.

It is another object of the present invention to provide a communications system between a host station and a plurality of remote stations, in which the remote stations receive power and addressing over a pair of lines which galvanically isolate the remote stations from the host station, and in which analog information is provided from the remote stations to the host station over a pair of isolated lines.

It is still another object of the present invention to provide a communications system between a host station and a plurality of remote stations which communicate over two pairs of wires and in which the host station is connected to one pair of wires by way of four switches organized to allow a polarity reversal on the pair of wires, and a second pair of wires over which real time analog data is transmitted back to the host station by the remote stations.

It is a further object of the present invention to provide a communications system between a host station and a plurality of remote stations which communicate over two pairs of lines and in which the host station addresses the plurality of remote stations by reversing the polarity of the power being supplied to the remote stations to provide a differential address signal, and in which the remote stations include rectifying means for extracting power from the pair of lines.

These and other features and advantages of the present invention will be more readily understood upon consideration of the following detailed description and accompanying drawings.

BRIEF DESCRIPTION OF THE DRAWINGS

FIG. 2a, 2b, and 2c (collectively FIG. 2), arranged in accordance with the map of FIG. 2, provide a more detailed block diagram of a typical remote station in accordance with the present invention.

DETAILED DESCRIPTION OF THE PRESENT INVENTION

Figure 1:
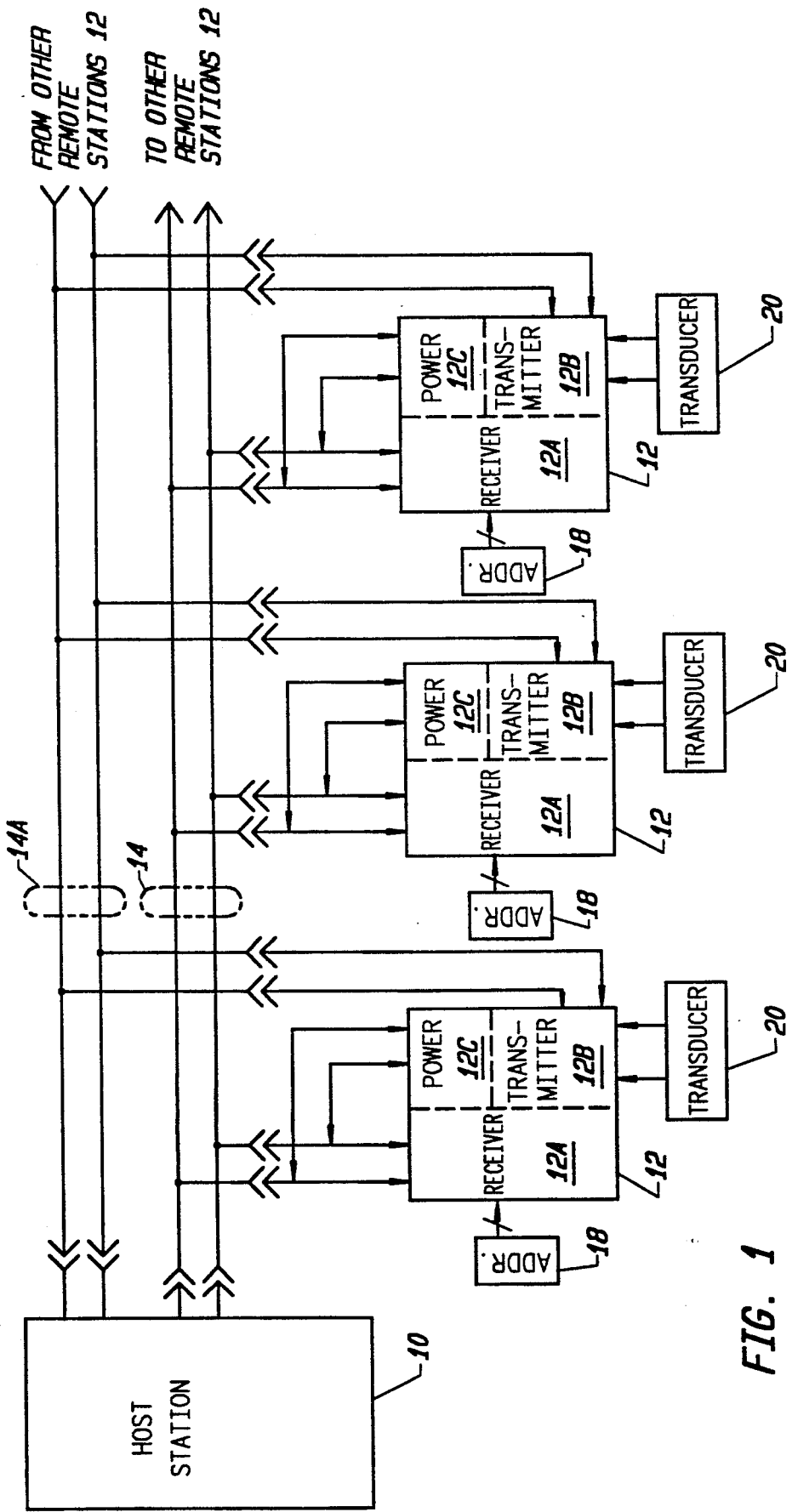
FIG. 1 is a simplified functional block diagram of the system of the present invention.

Referring to FIG. 1, the communications system of the present invention includes a host station 10 and a large number of remote stations 12. A first pair of wires 14 provides the power to and addressing from the host station 10 to the remote stations 12. Wire pair 14A provides a path for the transmission of real time analog information from the remote stations 12 back to the host station 10. Each of the remote stations 12 is connected in shunt across the two pairs of wires 14 and 14A.

Each remote station 12 includes a receiver section 12A, a transmitter section 12B, and a power section 12C. Also associated with each remote station 12 are (1) a unique address 18, which is programmable, and (2) a transducer or sensor 20 which provides information to the associated remote station 12 for transmission back to the host station 10.

The communications system of the present invention is especially suitable for use in installations where accessibility is limited once an initial installation of the system has been made, where hazardous conditions require special operating characteristics, or applications in which costs must be kept to a minimum.

Figure 2B:
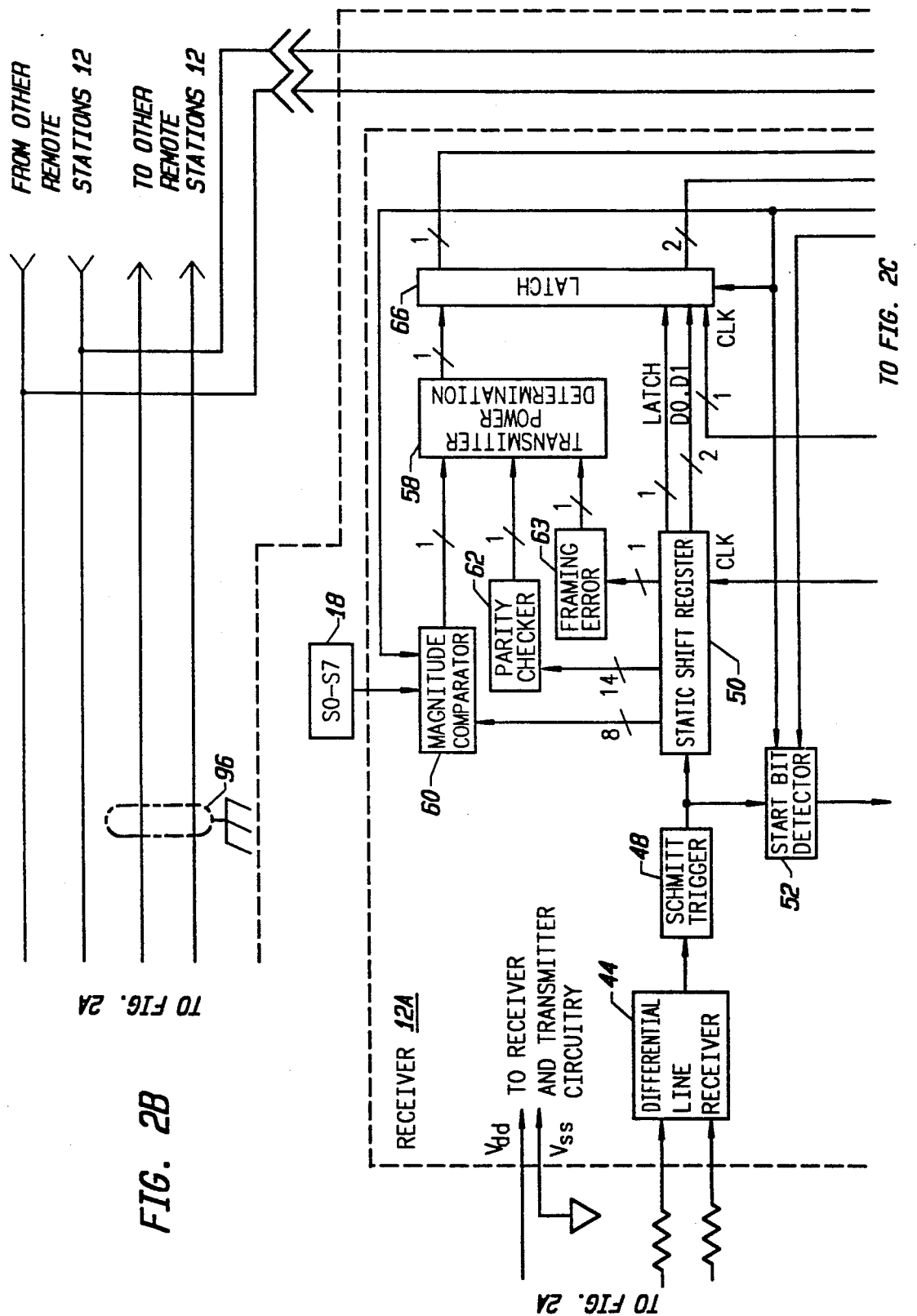
Figure 2C:
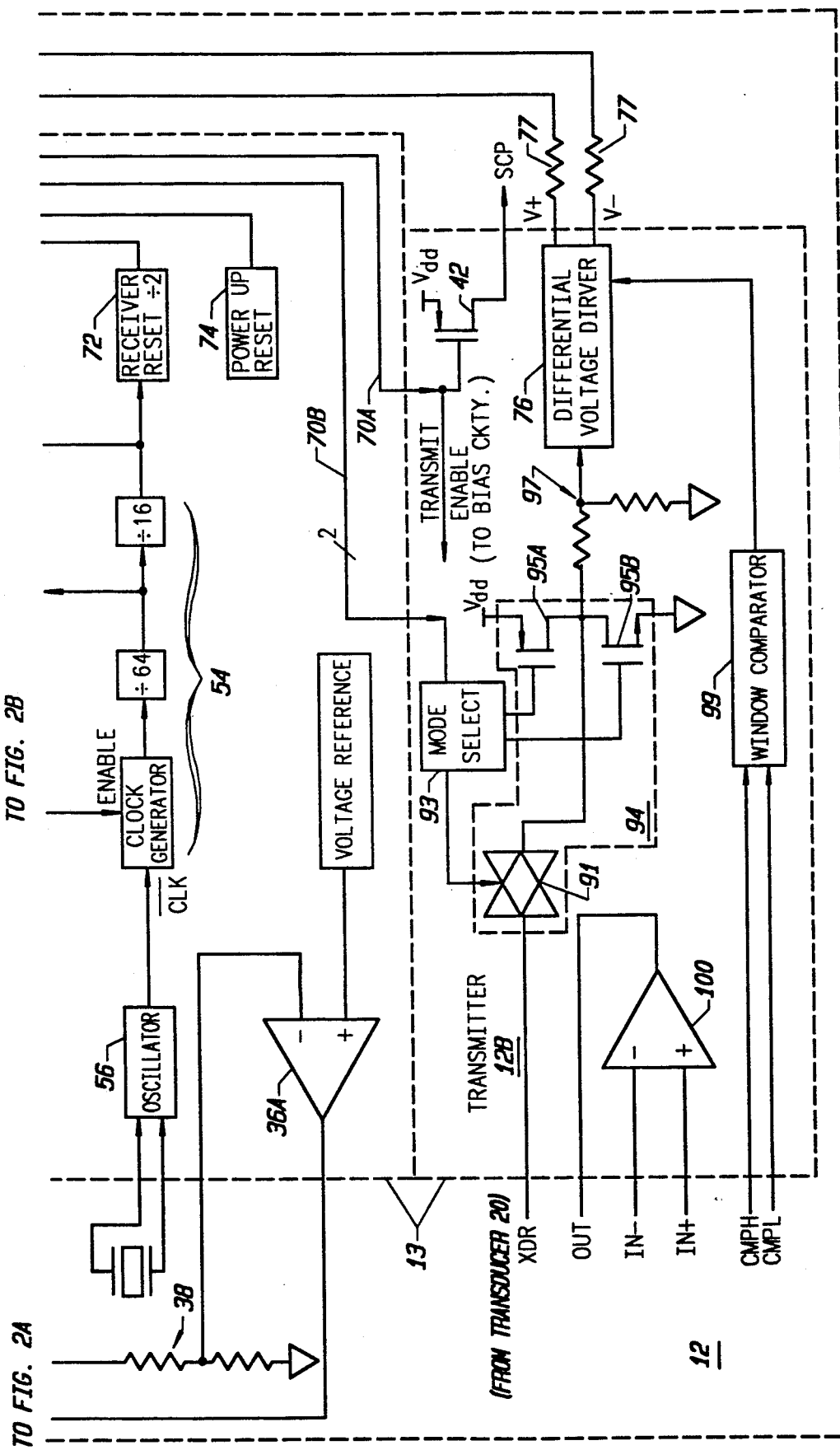

Referring now to FIG. 2, a typical remote station in accordance with the present invention will be described in greater detail. The receiver sections 12A of all remote stations are on at all times, while the transmitter sections 12B are typically off.

The receiver sections 12A, thus, listen for the addresses assigned to their associated remote station, and once that address is received, activate their associated transmitter sections 12B. A particular transmitter section is typically powered up when the associated remote station has been addressed by the host station and is transmitting information back to the host 10.

In connection with FIG. 2, the operation of the communications system of the present invention in connection with a typical remote station will be described, it being understood that all other remote stations operate in a similar manner to that illustrated in FIG. 2. In the preferred embodiment of the present invention, the host station 10 supplies power to the remote stations 12 through the pair of wires 14. Each wire of the pair of wires 14 is connected to a terminal of a power supply 28.

As mentioned above, addresses are also supplied from the host station 10 to the remote stations 12 over wire pair 14. Each such address is included in a longer bit-serial word. The bit serial word is placed on wire pair 14 by reversing the connections between wire pair 14 and the power supply 28 as a function of the logic state of each bit from the host station 10. A switch pair 30A and 30B are controlled by switch control block 32. Switch control block 32 is in turn controlled by the bit serial words from host station 10. Preferably, switch control block 32 is isolated with respect to wire pair 14 and power supply 28, such as can be obtained through the use of an opto-isolator arrangement, inductive or capacitive coupling, or the like. This results in electrical or galvanic isolation between the host station 10 and the wire pair 14.

Switch pair 30A and 30B are shown in FIG. 2 in a position which might correspond to an address bit having a logic state of zero. As such, switch 30A connects the positive terminal of power supply 28 to the upper wire of wire pair 14, and switch 30B connects the negative terminal of power supply 28 to having a logic state of one, switch control block 32 causes switch 30A to connect the positive terminal of power supply 28 to the lower wire of wire pair 14, and switch 30B to connect the negative terminal of power supply 28 to the upper wire of wire pair 14. In this manner, a differential addressing signal is generated on wire pair 14 in response to the addressing from host station 10.

As can be seen from FIG. 2, remote station 12 is connected in shunt across wire pair 14. Receiver section 12A is connected directly to wire pair 14, while power section 12C connects to wire pair 14 via a bridge rectifier 34. Bridge rectifier 34 operates to convert (i.e. rectify) any differential signals on the wire pair 14 into a single polarity voltage. Recall that such differential signals are present whenever the host stat on 10 addresses a remote station 12.

In FIG. 2, the dashed lines 13 surrounding receiver section 12A and transmitter section 12B are also used to denote circuitry embodied in an application-specific integrated circuit (ASIC) chip in which the commercial version of the present invention is embodied. The circuitry outside of these dashed lines are a part of the remote station circuitry but are not included within the ASIC chip.

Power Section 12C

A voltage regulator is provided in the power section 12C of each remote station and regulates the rectified voltage from bridge rectifier 34 to supply operating voltage $V_{dd}$ to both the receiver section 12A and transmitter section 12B. This operating voltage is supplied at all times. With respect to transmitter section 12B, however, the operational state of the circuitry therein is controlled by controlling bias currents within such circuitry. When the bias currents are cut back, the circuitry is placed into a quiescent state and very little current is drawn by the transmitter section 12B. When the bias currents are restored to a nominal level, the circuitry becomes fully operational. This technique is employed in commercially available programmable amplifiers, such as the LM4250 manufactured by National Semiconductor of Santa Clara, Calif. Thus, even though the transmitter section 12B has $V_{dd}$ applied to it at all times, the section remains in a quiescent state until a transmitter enable signal is supplied by the receiver section 12A on line 70A.

The voltage regulator of power section 12C can be a conventional series-pass regulator. In FIG. 2, one such arrangement is shown using a series pass transistor 36B and an error amplifier 36A. The regulated voltage, $V_{dd}$, is supplied to the rest of the circuitry of the remote station 12 at terminal 37 of transistor 36B. The operating voltage $V_{dd}$ is sampled using a resistive divider 38 and compared against a reference voltage, supplied by reference circuit 40, in error amplifier 36A. The output of error amplifier 36A is applied to control series pass transistor 36B so that $V_{dd}$ is at the proper magnitude.

Receiving Section 12A

Recall that receiving section 12A listens for the presence on wire pair 14 of the address assigned to the remote station 12 in which it is located. Also included with the address information is control information. The address and control information are a series of logic bits organized as a word. Each bit of the word is sent under control of the host 10. The receiving section 12A checks the entire word for parity and framing after the complete word is received from the host.

To do this, receiving section 12A captures each word that appears on wire pair 14 and compares selected bits in the word against the assigned address for the remote station. At the same time a parity check is performed and framing errors detected on the whole word. If the address matches, if parity is correct, and if there are no framing errors, the transmitter section 12B is powered up. The receiving section also extracts control information from the captured word. This extracted control information is then passed on to the transmitter section 12B for selection of information to be sent back to the host 10.

In the preferred embodiment of the receiving section 12A, the signals from wire pair 14 are applied to a conventional differential line receiver 44. The output of differential line receiver 44 is then shaped by Schmidt trigger circuit 48, before it is supplied to a static shift register 50 and to a start bit detector block 52.

Start bit detector block 52 detects the presence of a start bit on wire pair 14. At the rising edge of a start bit, the start bit detector block 52 supplies an enable signal to clock generator circuit 54, allowing clock generator circuit 54 to begin clocking the signal from oscillator 56. Clock generator circuit 54 receives the signal from oscillator 56, divides the signal down by selected amounts and supplies these divided-down signals to other circuits in receiver section 12A.

In the preferred embodiment of the present invention, oscillator 56 is crystal controlled and operates at a nominal frequency of 32.768kHz. In the preferred embodiment of the present invention, clock generator circuit 54 supplies a 512Hz clock (32.768kHz÷64) to the clock input of static shift register 50. This 512Hz clock corresponds to the 512 baud rate at which the host station 10 places serial data (e.g. address bits) on the wire pair 14. The 512Hz clock has a rising edge which occurs at approximately the center of each bit on wire pair 14 from host station 10. While the oscillator 56 is asynchronous relative to the start of the serial data from host station 10, the oscillator frequency is selected relative to the baud rate of the serial data, and the 512Hz clock supplied to the static shift register 50, so that there will be a cumulative error of no more than 50% or less between the center of the last bit of serial data on wire pair 14 and the rising edge of the 512Hz clock. In this manner, it can be assumed that all bits are correctly clocked into static shift register 50.

In the preferred embodiment of the present invention, the host station uses a 16-bit word which includes address and control information. Clock generator circuit 54 also supplies a 32Hz clock (512Hz÷16) to the transmitter power determination block 58. This permits the sixteen bits of data to be fully shifted into static shift register 50 before the output of transmitter power determination block 58 is examined to determine whether the transmitter is to be powered up.

Static shift register 50 receives a serial input and provides parallel outputs and therefore performs a serial to parallel conversion of the address and control bits from host station 10.

Figure 3:
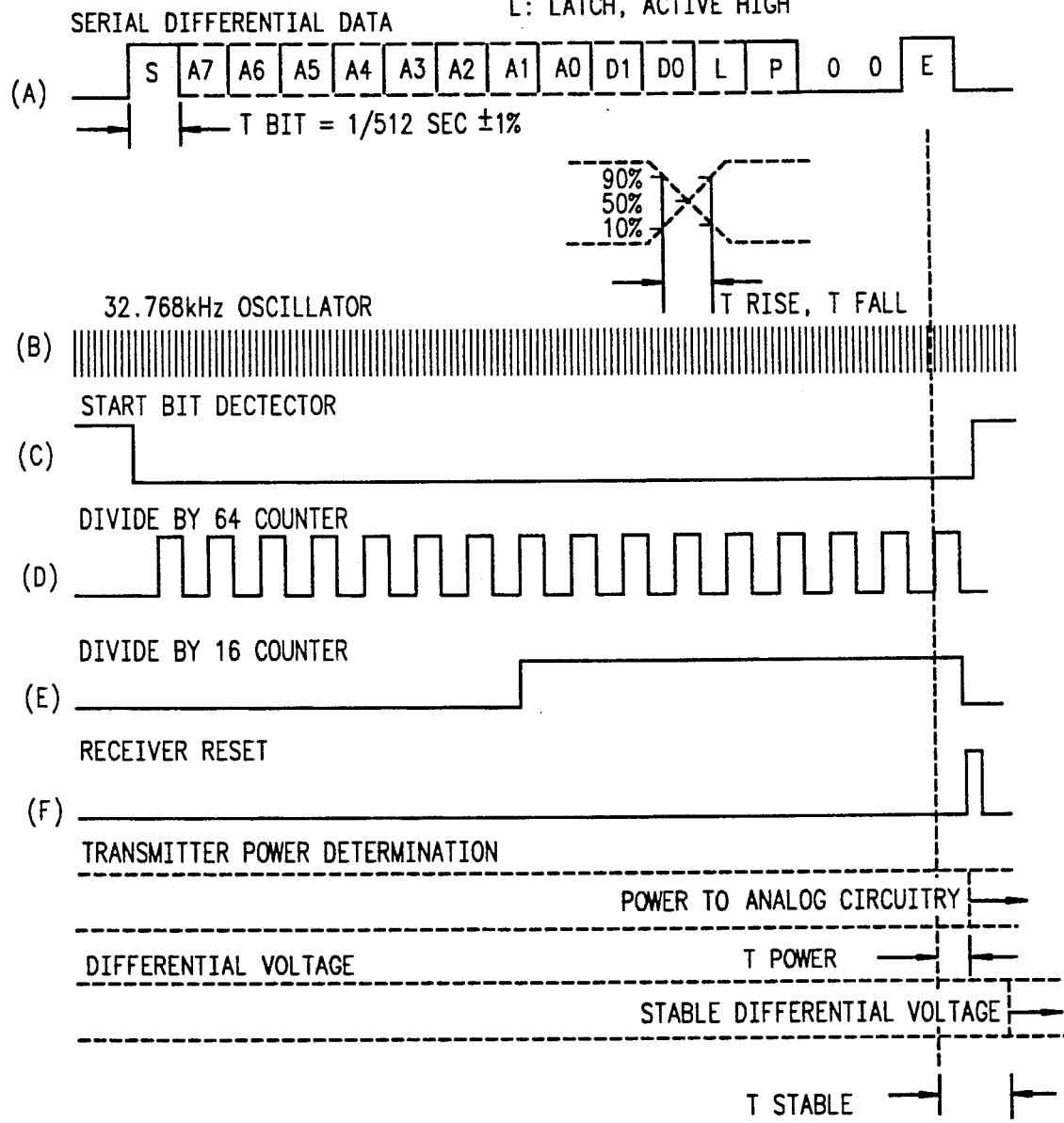
FIG. 3 is a timing diagram illustrating the addressing-/control information protocol employed in accordance with the present invention.

Referring now to FIG. 3, the addressing and control information protocol used by the host station 10 in the preferred embodiment of the present invention will be described in greater detail. Line (a) of the figure illustrates the 16-bit word sent by host station 10: 1) a start bit, S, having a logic one state; 2) eight address bits, A0-A7; 3) two control bits, D0 and D1; 4) a latch bit, L; 5) a parity bit (odd, excluding S and E bits); 6) two reserved bits, both having logic zero states; and 7) an end bit, E, having a logic one state.

In the preferred embodiment of the present invention, the control bits D0 and D1 specify the information to be transmitted back to the host station 10 as set forth in Table 1, below.

TABLE 1

| D1 | D0 | Information |
|---|---|---|
| 0 | 0 | High calibration level |
| 0 | 1 | Low calibration level |
| 1 | 0 | Actual transducer signal |

Also provided in FIG. 3 is a timing diagram which relates the nominal 32.768kHz signal, line (b), from oscillator 56, to the divide-by-64 clock, line (d), and divide-by-16 clock, line (e), provided by clock generator circuit 54.

Referring now to both FIGS. 2 and 3, it can be seen that the divide-by-16 clock operates as a clock signal to latch 66, and thus determines when the output of transmitter power determination circuit 58 is to be captured by latch 66. More specifically, this clock is asserted only after the data from the host 10 has been fully clocked into static shift register 50; i.e. only after sixteen cycles of the 512Hz clock have occurred. Prior to that time the output of transmitter power determination block 58 are effectively ignored.

The inputs to transmitter power determination block 58 are provided from magnitude comparator circuit 60, parity checker circuit 62, and framing error circuit 63, as follows.

Static shift register 50 provides parallel outputs of the data stored therein. Data from bit positions 8-15 (the address bits) are supplied to magnitude comparator 60 where they are compared against the programmed address from block 18. Programmed address block 18 can be implemented by a bank of micro switches or DIP switches, for example, having states selected during manufacture, installation, or subsequently by the user.

Data from all bit positions of static shift register 50, except the start and stop bits S and E, are applied to parity checker block 62. In the preferred embodiment of the present invention odd parity is used.

Finally, according to the protocol of FIG. 3, end bit E has a logic one state. The end bit E is supplied to framing error check circuit 63.

In the preferred embodiment of the present invention, the transmitter power determination block 58 performs a logical NOR on the three inputs. When the outputs of magnitude comparator block 60, of parity checker block 62, and of framing error circuit 63, are all at a logic zero state, a logic one state will be output from the NOR gate.

The output of transmitter power determination circuit 58, in this case a logic one state, will be latched into latch 66 when the divide-by-16 output from clock generator circuit 54 is asserted (negative going edge). Recall that the divide-by-sixteen output is asserted when sixteen bits have been clocked into static shift register 50. When the stored power determination bit is a logic one state, a signal is supplied via line 70A as the transmit power enable signal to powerup the transmitter section 12B.

The logic state from the latch-bit position of the static shift register 50 is used to maintain the transmitter section of an addressed remote station in an ON condition even when the remote station is no longer being addressed. More specifically, the latch 66 also stores the latch-bit state from the most recent word which addressed the particular remote station. This logic state is NORed with the transmitter power determination logic state, and the result is used to control the application of power to the transmitter section.

Figure 5:
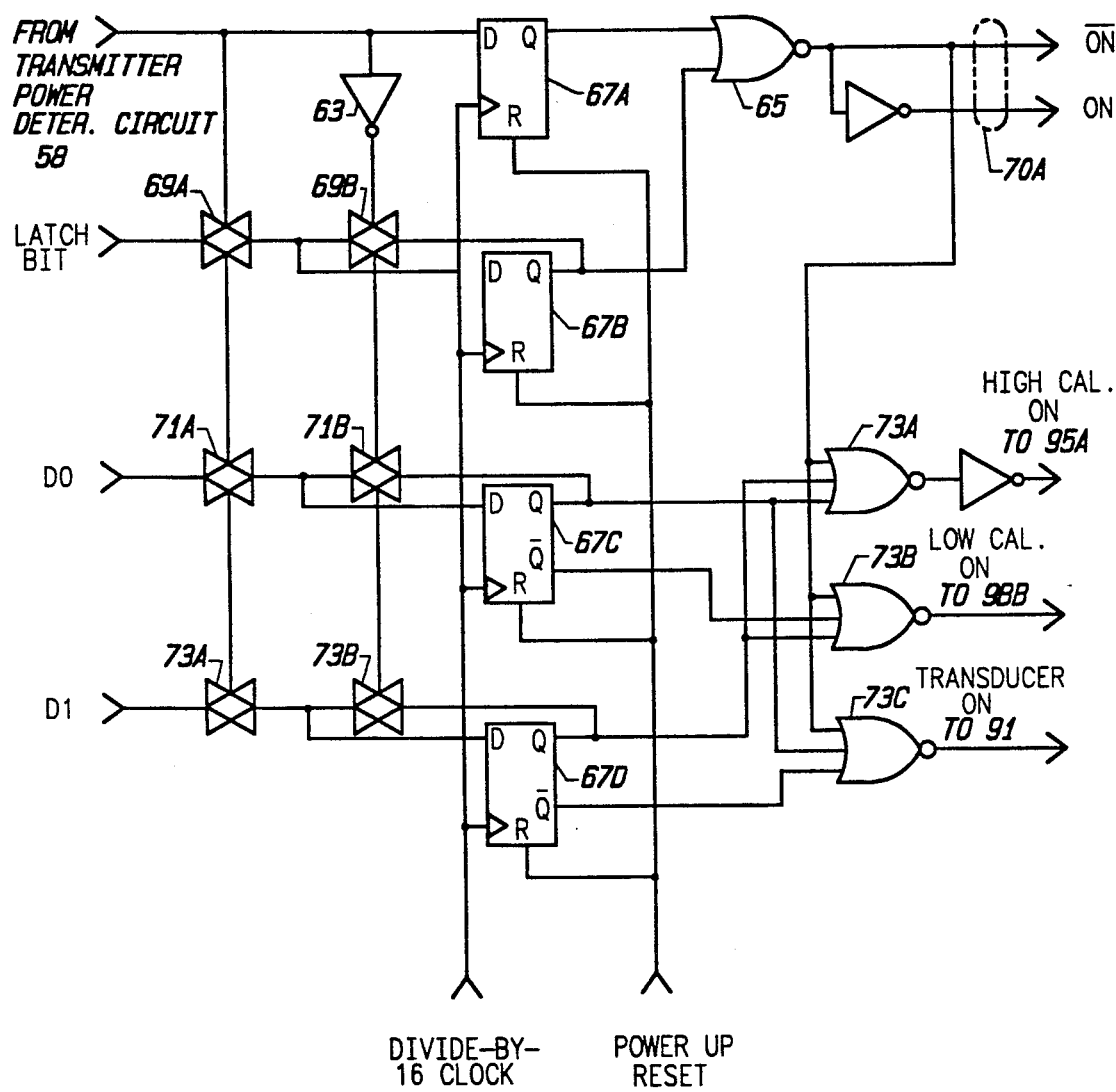
FIG. 5 is a more detailed schematic of the latch and control information decoding circuitry of the present invention.

Referring now to FIG. 5 the preferred embodiment of latch 66 will be described in greater detail. Latch 66 preferably has four D flipflops, one each for storing the transmitter power determination logic state (flipflop 67A), the latch-bit logic state (flipflop 67B), the D0 logic state (flipflop 67C), and the D1 logic state (flipflop 67D). Each D flipflop is clocked by the divide-by-sixteen clock from clock generator circuit 54, and reset by the power-up reset block 74.

The non inverted outputs of flipflop 67A (transmitter power determination state) and flipflop 67B (latch bit) are input to NOR gate 65. The output of NOR gate 65 is used to control the powering up of the transmitter 12B. Thus, it can be seen that if either, or both, flipflop 67A and 67B provide a logic one state, NOR gate 65 will provide a logic zero state, indicating that transmitter power is to be applied.

An analog switch is positioned each line which supplies the latch bit logic state, the D0 logic state, and the D1 logic state to the respective flipflops. These analog switches 69A, 71A, end 73A are controlled by the logic state of the output of the transmitter power determination circuit 58. Thus, when the output of the power determination circuit 58 is a logic one state, the logic states of the latch bit, D0, and D1 are passed to the respective flipflops 67B-67D.

It is also to be noted that the non inverted outputs of flipflops 67B-67D are fed back to their respective inputs by way of analog switches 69B, 71B, and 73B. These analog switches are controlled by the inverted logic state of the output of the transmitter power determination circuit 58. The inversion is provided by invertor 63. Thus, when the transmitter power determination circuit 58 determines that the word being analyzed *does not* address the particular remote station, the logic states then existing in flipflops 67B-67D are fed back on themselves, and any new logic states being applied to the latch bit, D0, and D1 inputs of latch 66 are blocked. Thus, the previously existing latch bit, D0 and D1 logic states are maintained and used to control transmitter section 12B.

It is to be noted that the line connecting the output of transmitter power determination block 58 to the input of D flipflop 67A does not include any analog switches. Thus, the contents of D flipflop 67A will reflect the current state of the transmitter power determination circuit 58, following the assertion of the divide-by-sixteen clock.

With the above configuration, a particular remote station 12 can be set to continue to transmit information, even after host 10 resorts to addressing other remote stations. It is to be noted that the remote station can be turned off by addressing it again with a word containing a zero logic state latch bit. This will cause a zero logic state to be latched into flipflop 67B. With the next word from host 10 which does not address the particular remote station 12, the output of NOR gate 65 will be a logic one and the transmitter power will be turned off. It is to be noted that the particular logic state employed on line 70A to indicate whether transmitter power is to be applied is a function of the circuitry being controlled. Whatever logic state is used, the transmitter is enabled when either the transmitter power determination circuit 58 indicates that the host 10 is addressing the particular remote station, or the stored latch-bit indicates that the particular remote station should be transmitting, or both.

Referring back to FIG. 3, lines (a) through (e), it can be seen that upon receipt of the start bit, S, the start bit detector 52 goes low, line (c). This causes the divide-by-64 output of the clock generator 54 to begin providing sixteen clock pulses to the static shift register 50. At the end of these sixteen clock pulses, the sixteen bits of the word from the host station 10 have been shifted into static shift register 50, and the latch-bit position should contain the latch bit, and the D0 and D1 positions should contain the control information.

At the end of the sixteen clock pulses, the divide-by-sixteen output of clock generator 54 provides a clock "transition" to latch 66 to permit it to store the output state of the transmitter power determination circuit 58, the latch bit, D0 and D1.

Also, at the end of the sixteen clock pulses, receiver reset circuit 72 issues a reset "transition" to start bit detector 52. This resets start bit detector 52, which turns off clock generator 54.

In the preferred embodiment of the present invention, the start bit detector is a JK flipflop which has its J input connected to the output of Schmidt trigger circuit 48, its K input connected to the output of receiver reset block 72, its $\overline{Q}$ output connected to the reset input of clock generator 54, and its clock input connected to the output of oscillator block 56.

Power up reset block 74 is provided to initialize the address detection circuitry of the receiver section 12A whenever power is reapplied to the remote station 12.

When an address not intended for the particular remote station 12 is received by receiver section 12A, the transmitter power determination circuit 58 detects this and provides a logic zero state to latch 66. If the latch bit state previously stored in flipflop 67B (FIG. 5) is a logic zero, this causes transmitter power supply 42 to return to a quiescent state.

Transmitter Section 12B

When power is applied to transmitter section 12B, information is transmitted back to the host station 10 over wire pair 14A. In the preferred embodiment of the present invention, a differential voltage is used.

Figure 7:
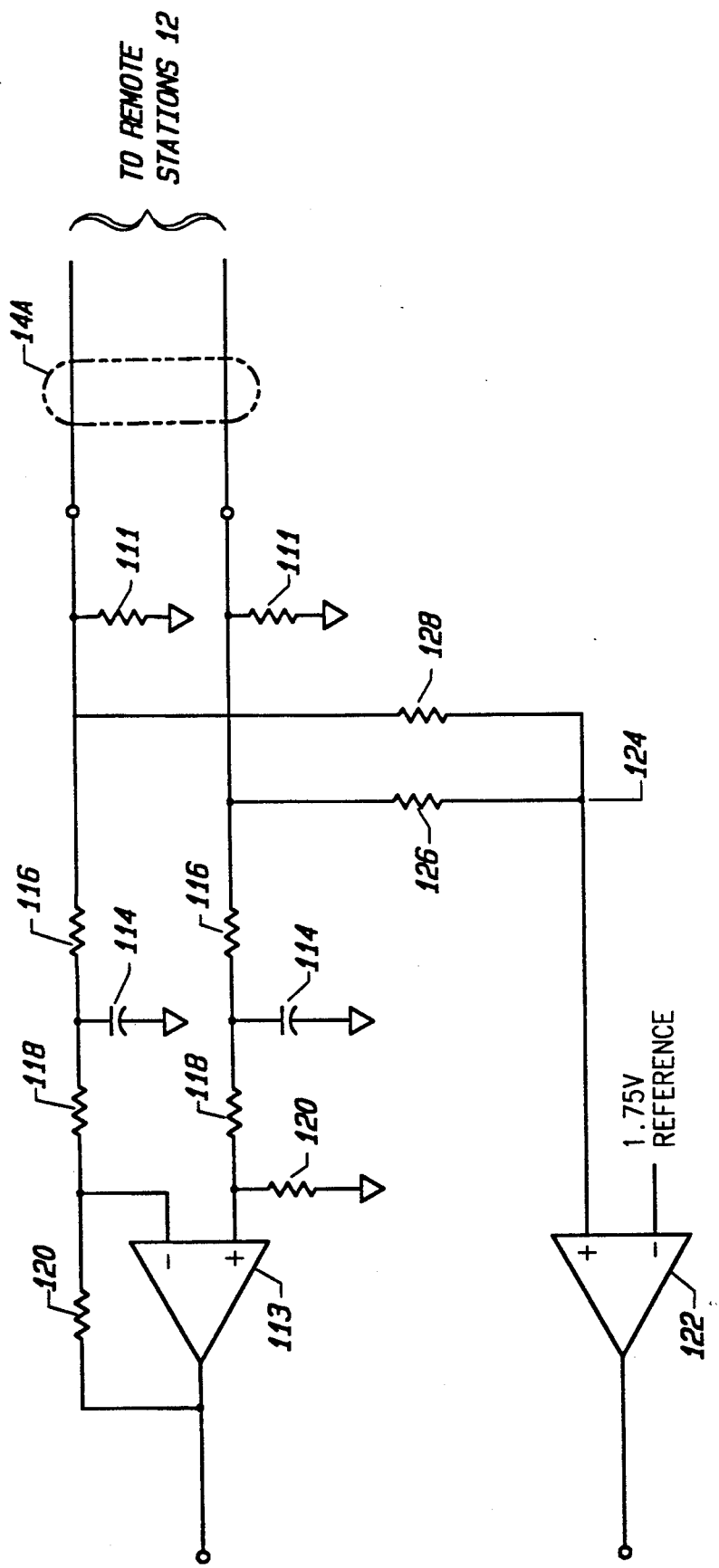
FIG. 7 is a differential operational amplifier circuit used at the host station for detecting signals being transmitted by the remote stations.

In the preferred embodiment of the present invention, the differential voltage is detected at the host station 10, using the operational amplifier configuration shown in FIG. 7. Resistors 11 are terminating resistors for wire pair 14A. Operational amplifier 113 is connected in a conventional differential amplifier configuration in order to reject common mode signals and accept differential voltage signals. Capacitors 114 are included to operate in conjunction with resistors 116, 118, and 120 to reject high frequency signals. For example, reception of signals below 3 KHz, the values of capacitors 114 and resistors 116, 118 and 120 would be selected to reject signals above 100 KHz. The values of resistor 116, 118 and 120 are also selected to present a high impedance to wire pair 14A and to provide high-impedance isolation between the host station 10 and wire pair 14A.

Operational amplifier 122 is used as a comparator and provides a summing node 124 at its non inverting input. Resistors 126 and 128 each connect one of the pair of wires 14A to summing node 124. As such, the voltage present at summing node 124 is the average of the signals appearing on wire pair 14A. The inverting input of operational amplifier 122 receives a reference voltage, which in the preferred embodiment of the present invention is 1.75 volts. The output of operational amplifier 122 goes low when the average of the signals appearing on wire pair 14A drops below the reference voltage. When this occurs, this indicates that all of the remote stations 12 are in the receiving mode only. An average voltage above the reference voltage indicates that one or more remote stations 12 are transmitting.

In transmitter section 12B, a differential voltage driver 76 places a real time, analog signal onto wire pair 14A in accordance with the signal supplied from switching configuration 94.

It is to be understood that the signal supplied to differential voltage driver 76 from switching configuration 94 is provided in real time and is in true analog form. Thus, in accordance with the present invention, the true dynamic nature of the signal from transducer 20 is transmitted to host station 10, and the information content of the transducer signal is preserved.

More specifically, referring back to FIG. 2, switching configuration 94 provides a single-ended signal to a conventional differential voltage driver 76. Differential voltage driver 76 has V+ and V− outputs which are coupled to wire pair 14A through resistors 77 for current limiting protection.

In accordance with the present invention, a full scale calibration voltage, zero level calibration voltage, and the actual signal from the transducer 20 are supplied to differential voltage driver 76 using switch configuration 94. See FIG. 2. Switching configuration 94 is controlled by mode select circuit 93, which decodes data bits D0 and D1 from latch 66 via line 70B. Switching configuration 94 includes a solid state switch 91 which connects signals from the transducer 20 to differential voltage driver 76, and also includes a pair of complementary switches 95A and 95B. Switch 95A, when activated, connects $V_{dd}$ to differential voltage driver 76. Switch 95B, when activated, connects the transmitter common to differential voltage driver 76. The activation of these switches is made in accordance with Table 1, hereinabove.

In the preferred embodiment of the present invention, the function of mode select block 93 is incorporated in latch 66. This is shown in further detail in FIG. 6. There it can be seen that NOR gates 73A, 73B, and 73C and the inverting and non inverting outputs of flipflops 67C and 67D are connected to decode D0 and D1 in accordance with Table 1, hereinabove. The output of NOR gate 65 is applied as an input to all three NOR gates 73A, 73B, and 73C so that they are, in effect, disabled when neither the stored latch bit, nor the stored transmitter power determination state, is a logic one state.

NOR gate 73A provides a control signal which is applied via an inverter to gate 95A, FIG. 2, to control the application of $V_{dd}$ to differential voltage driver 76. NOR gate 73B provides a control signal which is applied to gate 95B, FIG. 2, to control the application of the transmitter common potential to differential voltage driver 76. Finally, NOR gate 73C provides a control signal which is applied to analog switch 91, FIG. 2, to control the application of the transducer signal to differential voltage driver 76.

In the configuration just described, the voltage $V_{dd}$ is treated as the expected full scale voltage of the transducer, and transmitter common is treated as the expected zero scale voltage of the transducer. It is also to be noted that these voltages and signals are provided to differential voltage driver 76 by way of a resistive divider 97. This divider is used to scale the full scale, zero scale, and actual transducer signal voltages to a level compatible with the sensitivity of the differential voltage driver 76. Because all such voltages are provided to differential voltage driver 76 through the same resistive divider 97, errors are reduced.

Figure 4:
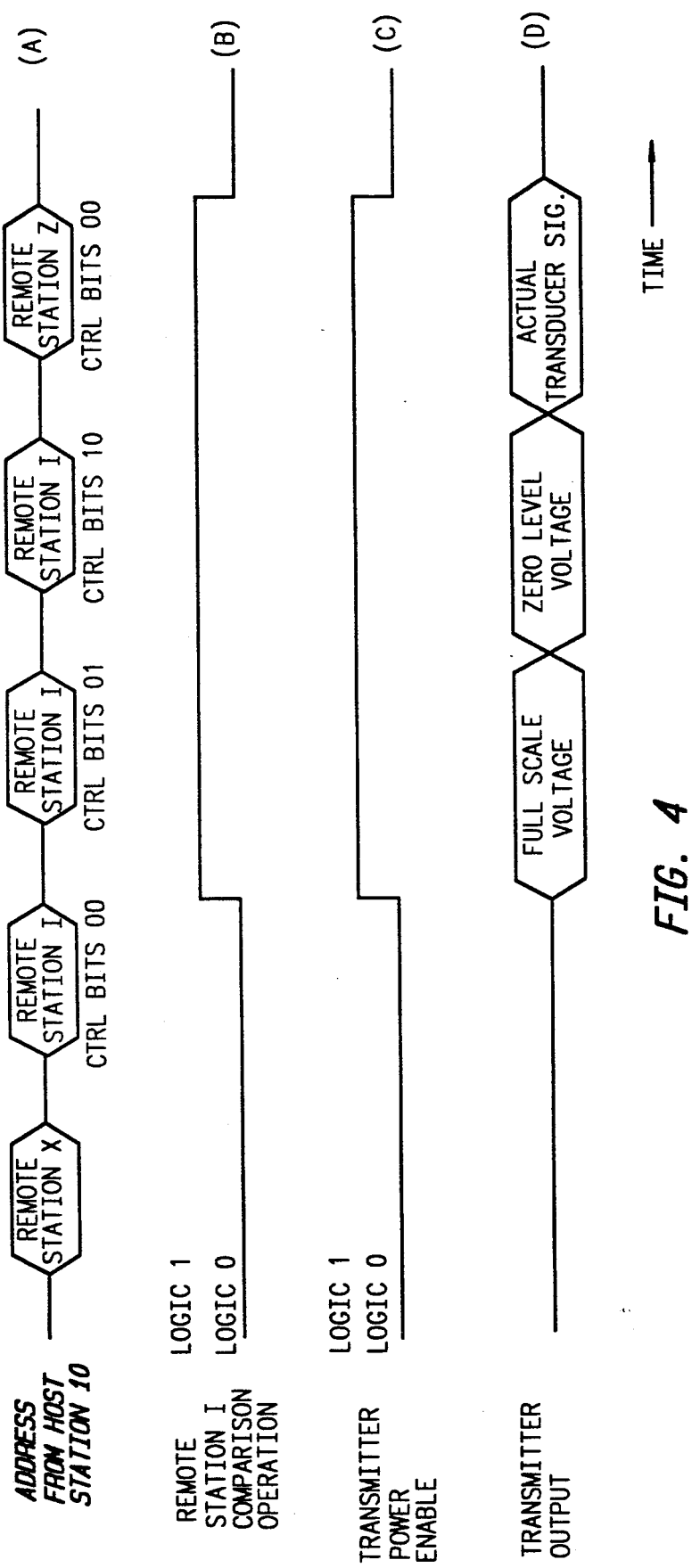
FIG. 4 is a simplified timing diagram showing a typical exchange between the host station and a remote station of the present invention.

FIG. 4 illustrates in simplified form of one possible information exchange sequence between host station 10 and a particular remote station. Line (a) of FIG. 4 represents serial words from host station 10 and includes an indication of the remote station being addressed. Line (b) represents the address comparison operation in the receiver section 12A. Line (c) represents the logic state of line 70A, FIG. 2, which is the transmitter power enable signal. Line (d) represents the information being transmitted back to the host station 10 by the particular remote station, in this example, remote station I.

In line (a) of FIG. 4, the left most portion of the waveform shows that the address from host station 10 is that of station X. As such, the output of the comparison operation in the remote station I is a logic zero state and the transmitter section remains in a quiescent state. As such, there is no transmitter output for this particular station.

The next address in line (a) is for the remote station I. Note that it also includes the control information 00. According to Table 1, hereinabove, this calls for a full scale or high calibration level from remote station I. This means that remote station I is being addressed by the host and the host is calling for the transmission back of a full scale signal. In response to this address, the comparison operation, line (b) results in a logic 1 state, and the transmitter power enable signal goes high to turn on the transmitter section. The content of the transmitter output is a differential voltage which is representative of the full scale transducer output.

In the typical sequence of communication between the host 10 and a remote station 12, the host first places an address on the wire pair 14 which includes the address for the particular remote station and control information calling for the transmission of the full scale value for the transducer.

Next, the remote station I address again appears on the address lines, but this time calling for a zero level output. The comparison operation continues to output a logic I and the transmitter power enable remains asserted. The transmitter output thereafter changes to a differential voltage that corresponds to the zero level output of the transducer 20.

Next, the remote station I address appears on wire pair 14, but this time calling for the actual information. The comparison operation continues to result in a logic one state and the transmitter power enable remains asserted. The transmitter content changes to a differential voltage representative of the actual transducer signal. The differential voltage transmitted by the transmitter section 12B changes in real time in proportion to the real time changes in the transducer signal and the rate of change of the differential voltage transmitted is in real time and in proportion to the rate of change of the transducer signal. The information therefore received at the host station 10 retains all of the dynamic character of the actual transducer signal.

Finally, FIG. 4, line (a) shows the appearance of an address for a different remote station Z calling for the full scale value from that different remote station. In response to this new address, the comparison operation results in a logic zero, the transmitter section in remote station I turns off, and the transmitter signal goes dormant.

In the preferred embodiment of the present invention, the voltage from power supply 28 used to power the remote stations is kept low, preferably approximately 17 volts. This is compatible with hazardous area requirements. Preferably the voltage driver 76 provides a differential output that varies around 0 volts with a deviation of $+/-3$ volts. The output signal for each of the transducers is preferably normalized to have a 5 volt full scale value. It is to be understood that the foregoing values are selected as a function of cable transmission characteristics and analog signal bandwidth.

In the preferred embodiment of the present invention, a window comparator 99 is used to monitor a signal from the transducer signal conditioning circuitry. Comparator high (CMPH) and comparator low (CMPL) are the inputs to window comparator 99. Within window comparator 99 is circuitry, not shown, which define a window or range corresponding to the expected normal operating range of the signal being monitored from the transducer channel. If the monitored signal falls outside of this window, the signal from differential voltage driver 76 will be a high impedance or an OFF-STATE. This will occur for an open transducer or transducer cable, or for signals that greatly exceed normal ranges, for example.

Figure 6:
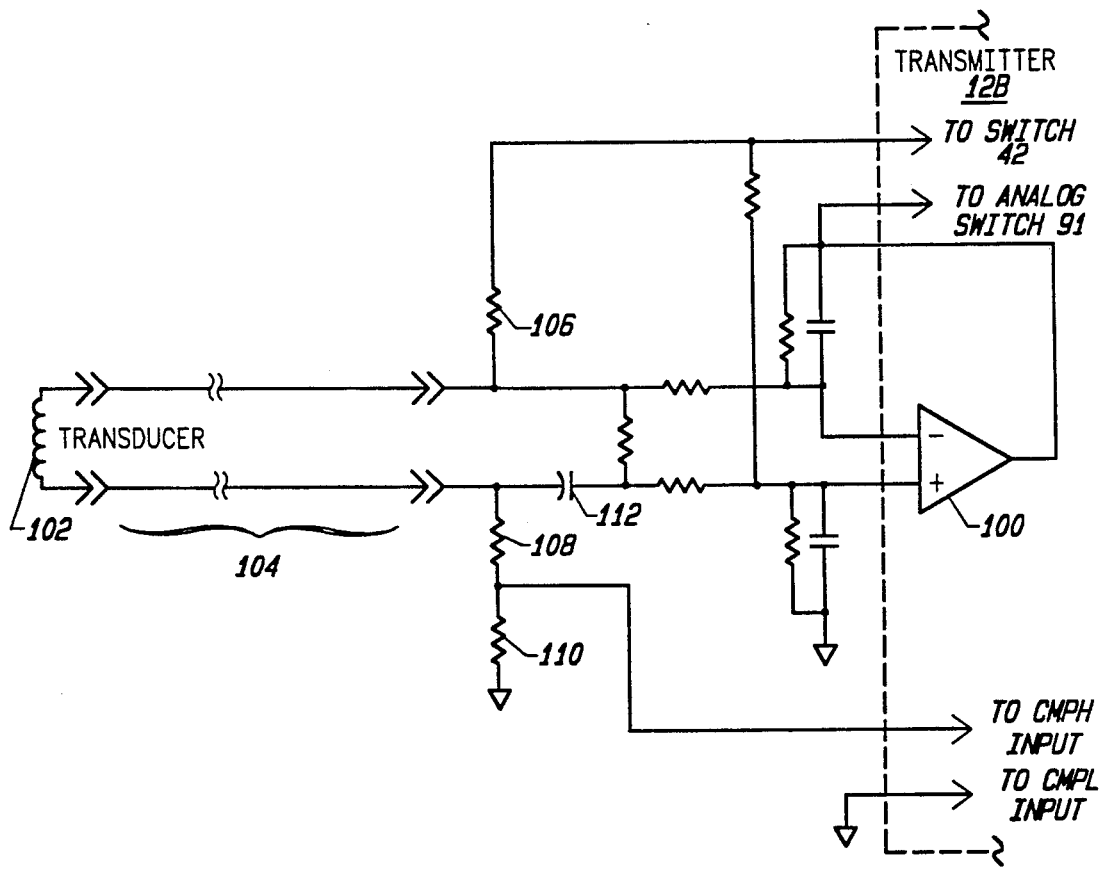
FIG. 6 is a typical example of the signal conditioning used in connection with a transducer signal and of the source of signals to the window comparator of the transmitting section.

Referring to FIG. 6, an example of typical transducer signal conditioning electronics will be described. In this example, amplifier 100, FIG. 2, is used to provide a differential amplifier stage. Amplifier 100 is an auxiliary amplifier included on the ASIC chip embodiment of the present invention referred to hereinabove. Under other circumstances, such as where special amplifier performance characteristics are desired, a separate integrated circuit amplifier can be used.

In FIG. 6 it can be seen that a transducer 102 is connected to the remote station 12 by way of a transducer cable 104. Amplifier 100 is configured as a balanced differential amplifier. The output of amplifier 100 is connected to the input of analog switch 91. Resistors 106, 108 and 110 are connected to set up a low-level DC current through transducer cable 104 and transducer 102. A voltage is generated at the junction of resistors 108 and 110 which will fall within the window of window comparator 99 when the transducer is operating properly and the transducer cable is intact. When, for example, the transducer cable 104 becomes open circuited, the voltage at the junction of resistors 108 and 110 will fall to the transducer common potential, and thus fall outside of the window of window comparator 99.

Resistor 106 is connected at one end to switch 42. Switch 42 supplies power to circuits, such as a transducer or transducer conditioning electronics, of remote station 12 which are external to the ASIC chip. The other end of resistor 106 is connected to one of the leads f the transducer cable 104. Resistor 108 is connected at one end to the other lead of transducer cable 104, and at the other end to resister 110. The other end of resistor 110 is connected to the transmitter common. A current loop is therefore set up which causes current to flow from switch 42 into resistor 106, then through transducer cable 104 into transducer 102. The current then exits transducer 102, flows back through another line of transducer cable 104, and thence through resistors 108 and 110 to the transmitter common. Capacitor 112 serves as a DC blocking capacitor to keep the DC current which flows through the transducer 102 out of PATENT the amplifier circuitry. If a break occurs anywhere in the current loop, the voltage at the junction of resistors 108 and 110 will fall to zero.

As an example, assume the window comparator 99 has a window of 0.25 volts to 4.75 volts. If the voltage supplied by switch 42 is approximately 5 volts, if resistors 106, 108 and 110 have respective values of 348kΩ, 249kΩ, and 100kΩ, and if the transducer and cable have a combined resistance of 300 to 1kΩ, a voltage of approximately 0.7 volts will be present at the function of resistors 108 and 110. This is well within the voltage window of window comparator 99. When a break in transducer cable 104 occurs, DC current flow will stop and the voltage across resistor 110 will be zero volts, well below the 0.25 volt low side of the voltage window of comparator 99.

In the preferred embodiment of the present invention, the receiver section 12A, the transmitter section 12B, and portions of the power section 12C, are implemented in large part in the form of a custom ASIC integrated circuit. As indicated above, the circuitry embodied in the ASIC chip are enclosed in dashed lines 13. As a result, it is to be understood that while the functions implemented are similar to those which can be implemented in discrete versions of the present invention, the actual circuitry employed to implement such functions in the custom integrated circuit is a function of the circuits and techniques employed by the particular manufacturer of such custom integrated circuit and may be accomplished in a different manner than in commercial IC's.

In discrete IC versions of the present invention, the transmitter section 12B, the mode select circuit 93 and the switching configuration 94 can be implemented by device number 74HC4052 and the differential voltage driver 76 can be device number LM346 manufactured by Signetics Corporation of Sunnyvale, Calif.

In the discrete IC version of receiver section 12A, the differential line receiver 44 can be device number LM346 manufactured by National Semiconductor Corporation. The magnitude comparator 60 can be device number 74HC688, the parity checker 62 can be implemented with device number 74HC280, the static shift register 50 can be implemented with device number 74HC4015, and the clock generator 54 can be implemented with device number 74HC4040, all manufactured by Signetics Corporation.

The host station 10 of the present invention can be a general purpose computer, such as a personal computer. As discussed above, transmissions from the remote stations 12 are received by the host station by detecting the differential variations in voltage on wire pair 14A as shown in FIG. 7. The output of the differential voltage detector of FIG. 7 is then applied to an analog to digital converter (not shown), preferably having 12-bit resolution, to provide binary words which can be processed by the general purpose computer employing conventional analysis techniques.

Addressing by the host station 10 can be implemented through a digital port of the general purpose computer, not shown, which drives isolated switch control 32.

Figure 8:
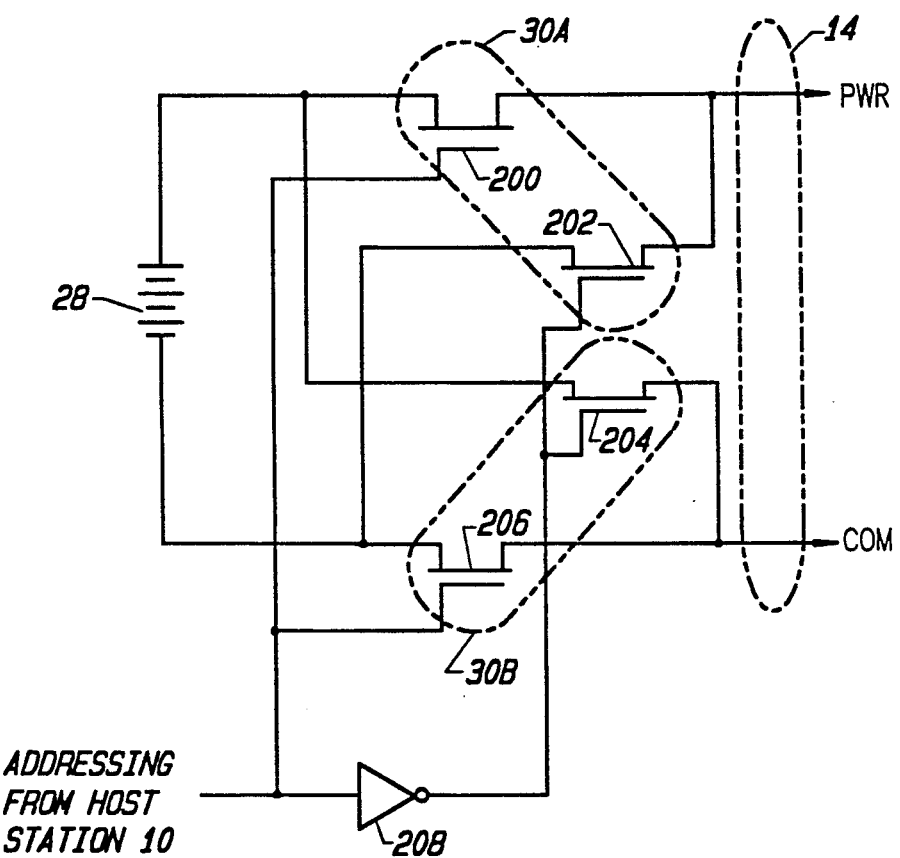
FIG. 8 illustrates a practical switch arrangement for supplying power and addressing on a single pair of wires in accordance with the present invention.

FIG. 8 illustrates a practical implementation of switches 30A and 30B. In this configuration, a pair of field effect transistors 200 and 202 are employed to implement switch 30A, and a pair of field effect transistors 204 and 206 implement switch 30B. The address signal from host station 10 is applied directly to the gates of field effect transistors 200 and 206, and via an inverter 208 to the gates of field effect transistors 202 and 204. Thus, when the addressing from host station 10 is a logic one, the positive terminal of power source 28 is connected to the upper wire of wire pair 14 through field effect transistor 200, and the negative terminal of power source 28 is connected to the bottom wire of wire pair 14 through field effect transistor 206. Conversely, when the addressing from host station 10 is a logic zero, the positive terminal of power source 28 is connected to the bottom wire of wire pair 14 through field effect transistor 204, and the negative terminal of power source 28 is connected to the upper wire of wire pair 14 through field effect transistor 202.

It is envisioned that the system of the present invention will accommodate lines of at least 4,000 feet in length using 18 gauge wire. Further, the system will accommodate the use of barrier resistors in series with each wire in the wire pair 14. It is envisioned that the wire pair 14 will be twisted together as one twisted pair, and that wire pair 14A will be twisted together as a second twisted wire pair, and that the two twisted pairs will be encased in an overall shield 96.

The system according to the present invention has been built with a power consumption for a typical remote station of approximately 42 microamps when the remote station is asleep, and approximately 5 milliamps (maximum), plus the transducer power requirement, when the remote station is transmitting.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. A communication system comprising
a host station;
a plurality of remote stations each associated with a sensor;
a first wire and a second wire forming a first pair of lines to which the plurality of remote stations are coupled in shunt, and which the host station can use to address any one of the plurality of remote stations with which it desires to communicate and can use to substantially continuously supply power to the remote stations;
a source of power having a positive terminal and a negative terminal;
first switch means controlled by the host, and connected to the positive terminal of the source of power and to the first pair of lines for connecting the positive terminal to the first wire when a first signal state is issued by the host, and for connecting the positive terminal to the second wire when a second signal state is issued by the host;
second switch means controlled by the host and connected to the negative terminal of the source of power and to the first pair of lines for connecting the negative terminal to the second wire when the first signal state is issued by the host and for connecting the negative terminal to the first wire when the second signal state is issued by the host, so that the host can place differential address and control signals upon the first pair of lines while power is being supplied to the remote stations on the first pair of lines:
a second pair of lines, separate from the first pair of lines, which the host station can use to receive differential signals communicated to it by an addressed remote station; and
wherein each of the remote stations operates with voltages and currents compatible with hazardous area requirements and includes
receiving means coupled to the first pair of lines and responsive to the differential address and control signals from the host station for determining when the host station is addressing the remote station and thereupon issuing a transmitter enable signal, and for extracting control information from the differential address and control signals;
means for receiving a sensor signal;
transmitting means which are normally in a quiescent state and responsive to the extracted control information for transmitting a real time differential voltage signal to the host station over the second pair of lines when the transmitter enable signal is issued by the receiving means, wherein the real time differential voltage signal is selected by the extracted control information from among the sensor signal, a first analog signal having a magnitude which is the full scale value of the sensor signal, and a second analog signal having a magnitude which is the zero level for the sensor signal, and wherein the transmitting means maintains the sensor in a quiescent state until the transmitter enable signal is issued, and further wherein the transmitting means are configured so that, when the sensor signal is selected for transmission, the real time differential voltage signal which is transmitted changes in real time in proportion to real time changes in the sensor signal, and the rate of change of the real time differential voltage signal is in real time and in proportion to the rate of change of the sensor signal, so that the differential voltage signal retains substantially all of the dynamic character of the sensor signal, and the information content of the sensor signal is substantially preserved in the differential voltage signal, and further wherein the sensor signal can have frequencies on the order of several thousand hertz.

2. The apparatus of claim 1, wherein the receiving means includes
means for capturing the differential address and control signals from the host appearing on the first pair of lines;
means for extracting the differential addresses from the captured signals and comparing the extracted addresses against a preassigned address for the associated remote station; and
means for extracting the control information from the captured signals when the extracted address matches the preassigned address.

3. The apparatus of claim 2, wherein the signal capturing means comprises
serial to parallel register means coupled to the first pair of lines for storing the signals being captured; and
clock means coupled to the first pair of lines and to the serial to parallel register means, and responsive to a start bit in the signals present on the first pair of lines, for clocking the serial to parallel register means a predetermined number of times to store the signals being captured in the serial to parallel register means.

4. The apparatus of claim 1, wherein the transmitting mans operates off of an operating voltage referenced to a common potential and further wherein the sensor signal receiving means includes
means coupled to a transducer for conditioning signals from the transducer and for supplying the conditioned transducer signals to the sensor signal receiving means as the sensor signal; and
wherein the first analog and the second analog signals are the operating voltage and the common potential, respectively, of the transmitting means.

5. The apparatus of claim 4, wherein the transmitting means includes
a differential voltage driver coupled to the second pair of lines for applying the real time differential voltage signal to the second pair of lines in differential form;
means responsive to the extracted control information for selecting from among the sensor signal, and the first and second analog signals, comprising
a pair of switches, one of which is controllable to input the operating voltage to the differential voltage driver as the full scale value, and the other of which is controllable to input the transmitter common potential to the differential voltage driver as the zero level; and
an analog switch which is controllable to input the sensor signal to the differential voltage driver.

6. The apparatus of claim 1, wherein the control information from the receiving means includes a latch bit, and further including means responsive to the presence of the latch bit and the transmitter enable signal for supplying the transmitter enable signal to the transmitting mans even when the host station subsequently addresses other remote stations.

7. A communication system comprising
a host station;
a plurality of remote stations, each of which can be associated with a different sensor means;
a first pair of lines to which the remote stations are coupled in shunt, and which is used by the host station to substantially continuously supply power to the remote stations ad to uniquely select and control any of the remote stations by way of differential address and control signals;
a second pair of lines, separate from the first pair, to which the remote stations are coupled in shunt, and which the host station can use to receive differential voltage signals communicated to it by one or more selected remote stations;
and wherein each of the remote stations operates at voltages and currents compatible with hazardous area requirements and includes
means responsive to address and control signals received on the first pair of lines from the host station for differentially transmitting information to the host over the second pair of lines when the remote station is addressed by the host, wherein the information transmitted is designated by the received control signals and can include a full scale voltage and a zero scale voltage for signal calibration, sensor condition information, and real time dynamic signals from a transducer, and wherein transmission of the designated information continues until control signals are received by the remote station to cease transmission, and further wherein the means for differentially transmitting information includes driving means which are configured so that when the real time dynamic signals from the transducer are transmitted, the differentially transmitted information changes in real time in proportion to the real time changes in the transducer signal and the rate of change of the differentially transmitted information is in real time and in proportion to the rate of change of the transducer signal, so that the differentially transmitted information retains substantially all of the dynamic character of the transducer signal and the information content of the transducer signal is substantially preserved, and further wherein the transducer signal can have frequencies on the order of several thousand hertz.

8. The communication system of claim 7 wherein each of the remote stations operate at voltages no greater than approximately 17 volts and currents no greater than approximately 5 milliamps.

9. The apparatus of claim 7, wherein the transmitting means includes a transmitting section which is in a quiescent state, and which withholds power from the associated sensor means, until activated by the receiving means.

10. The apparatus of claim 9, wherein the control signals include a latch bit, and further including means responsive to the presence of the latch bit when the remote station is addressed by the host, for continuing transmission by the remote station even when the host station subsequently addresses other remote stations.

11. The apparatus of claim 7, wherein the first pair of lines include a first wire and a second wire to which the plurality of remote stations are coupled in shunt, and further including
a source of power having a positive terminal and a negative terminal;
first switch means controlled by the host and connected to the positive terminal of the source of power and to the first pair of lines for connecting the positive terminal to the first wire when a first signal state is issued by the host and for connecting the positive terminal to the second wire when a second signal state is issued by the host; and
second switch means controlled by the host and connected to the negative terminal of the source of power and to the first pair of lines for connecting the negative terminal to the second wire when the first signal state is issued by the host and for connecting the negative terminal to the first wire when the second signal state is issued by the host, so that the host can place differential address and control signals upon the first pair of lines while power is being supplied to the remote stations on the first pair of lines.

12. The apparatus of claim 7, wherein the transmitting means operates off of an operating voltage referenced to a common potential and further including
means coupled to a transducer for conditioning signals from the transducer and for supplying the conditioned transducer signals as the real time dynamic information; and
wherein the full scale voltage and zero scale voltage are the operating voltage and the common potential, respectively, of the transmitting means.

13. The apparatus of claim 12, wherein the transmitting means includes
a differential voltage driver coupled to the second pair of lines for applying the designated information to the second pair of lines in differential form;
means responsive to the received control signals for selecting from among the full scale voltage and the zero scale voltage for signal calibration, the sensor condition information, and the real time dynamic information, comprising
a pair of switches, one of which is controllable to input the operating voltage of the transmitting means to the differential voltage driver as the full scale voltage and the other of which is controllable to input the common potential of the transmitting means to the differential voltage driver as the zero scale voltage; and
an analog switch which is controllable to input the conditioned transducer signal to the differential voltage driver as the real time dynamic information.

14. The apparatus of claim 13, further including
means coupled to the transducer for indicating the condition of the transducer.

15. The apparatus of claim 14, wherein the transducer condition indicating means include
means for forming a current loop when the transducer is properly connected to the remote station; and
means coupled to the current loop forming means and to the differential voltage driver for detecting when the current loop is broken and for supplying a sensor condition signal to the differential voltage driver.

16. A method for communication between a host station and a plurality of remote stations
   (1) connecting each of the plurality of remote stations in shunt across a first pair of lines;
   (2) supplying power to the remote stations by way of the first pair of lines;
   (3) communicating information from the remote stations to the host station by way of a second pair of lines different from the first pair of lines;
   (4) coupling the host station to the first pair of lines by way of switching means controllable by the host station;
   (5) connecting a source of power in series with the switching means and the lines in the first pair of lines to substantially continuously supply power to the plurality of remote stations;
   (6) alternating the polarity of the connection of the source of power to the pair of lines by controlling the switching means in response to bit serial addresses from the host station to address particular ones of the plurality of remote stations; and
   (7) causing the particular addressed remote station to place a differential voltage signal on the second pair of lines which is in the form of real time signal from the addressed remote station and which is selected from a full scale voltage and a zero scale voltage for signal calibration, sensor condition information, and real time dynamic signals from a transducer, and further employing driving means which are configured so that when the real time dynamic signal from the transducer are placed on the second pair of lines, the real time dynamic signal changes in real time in proportion to the real time changes in the transducer signal and the rate of change of the real time dynamic signal is in real time and in proportion to the rate of change of the transducer signal, so that the real time dynamic signal retains substantially all of the dynamic character of the transducer signal and the information content of the transducer signal is substantially preserved in the real time dynamic signal, and further wherein the transducer signal can have frequencies on the order of several thousand hertz.

17. The method of claim 16, wherein step "(6)" includes the steps of
   a. inserting control data into the bit serial addresses from the host station to designate the type of real time information to be transmitted by the addressed remote station;
   b. extracting the control data from the serial bit stream at the addressed remote station; and
   c. transmitting the designated real time information until directed otherwise by subsequent control data from the host station.

18. A communication system comprising:
   a host station;
   a plurality of remote stations, each of which can be associated with a different transducer which provides a transducer signal;
   a first wire and a second wire forming a first pair of lines to which the remote stations are connected in shunt, and which carry operating power from the host station to the remote stations, and further which carry differential address and control signals from the host station to the remote stations;
   a source of operating power located at the host station and having a positive terminal and a negative terminal;
   switch means controlled by signals issued by the host station for connecting the positive terminal of the source of operating power to the first wire of the first pair of lines and the negative terminal to the second wire of the first pair of lines when the signals issued by the host station have a first logic state, and for connecting the positive terminal to the second wire and the negative terminal to the first wire when the signals issued by the host station have a second logic state, so that the host station can place on the first pair of lines differential address and control signals for the remote stations while substantially continuously supplying operating power to the remote stations;
   a second pair of lines, different from the first pair, to which the remote stations are coupled in shunt, and which carries real time, analog signals in differential form from the remote stations to the host station, wherein each of the remote stations comprise
      means coupled to the first pair of lines for extracting address and control information from the differential address and control signals, for continuously extracting operating power at an operating voltage referenced to a signal-common potential from the first pair of lines, and for issuing a transmitter enable signal when the address and control information indicate that the remote station is to communicate with the host station; and
      transmitter means which are normally in a quiescent state and which are coupled to the extracting means, to the transducer means, and to the second pair of lines, for transmitting real time, analog signals in differential form on the second pair of lines when the transmitter enable signal is issued, the transmitter means including means for differentially driving the second pair of lines with a differential voltage form of either the transducer signal, the operating voltage, or the signal-common potential as selected by the extracted control information, wherein the driving means are configured so that the differential voltage form of the transducer signal changes in real time in proportion to the real time changes in the transducer signal and the rate of change of the differential voltage form of the transducer signal is in real time and in proportion to the rate of change of the transducer signal so that the differential voltage form retains substantially all of the dynamic character of the actual transducer signal and the information content of the transducer signal is substantially preserved in the differential voltage form, and further wherein the actual transducer signal can have frequencies on the order of several thousand hertz.

* * * * *